(12) United States Patent
Mora et al.

(10) Patent No.: US 10,801,473 B2
(45) Date of Patent: Oct. 13, 2020

(54) HUB CRANE ASSEMBLY FOR A WIND TURBINE

(71) Applicant: General Electric Company, Schenectady, NY (US)

(72) Inventors: Daniel Gomez Mora, Barcelona (ES); Jacob Thomas Hoyt, Cazenovia, NY (US); Michael Royce Johnson, Campton, NH (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 15/967,782

(22) Filed: May 1, 2018

(65) Prior Publication Data
US 2018/0297822 A1 Oct. 18, 2018

(30) Foreign Application Priority Data
Mar. 29, 2017 (EP) .................................... 17382156

(51) Int. Cl.
F03D 13/10 (2016.01)

(52) U.S. Cl.
CPC ...... F03D 13/10 (2016.05); *B66C 2700/0392* (2013.01); *F05B 2230/61* (2013.01); *F05B 2240/2211* (2013.01); *F05B 2240/912* (2013.01); *F05B 2240/916* (2013.01); *Y02E 10/728* (2013.01); *Y02P 70/523* (2015.11)

(58) Field of Classification Search
CPC ...................................................... F03D 13/10
See application file for complete search history.

(56) References Cited

U.S. PATENT DOCUMENTS

| 7,785,073 | B2 | 8/2010 | Wobben |
| 8,052,396 | B2 | 11/2011 | Wobben |
| 8,104,631 | B2 * | 1/2012 | Stegemann ............. B66C 23/06 212/179 |
| 8,118,552 | B2 | 2/2012 | Nies |
| 8,161,693 | B2 | 4/2012 | Krogh et al. |

(Continued)

FOREIGN PATENT DOCUMENTS

| CN | 201343379 Y | 11/2009 |
| CN | 202880704 U | 4/2013 |

(Continued)

OTHER PUBLICATIONS

Extended European Search Report and Opinion issued in connection with corresponding EP Application No. 17382156.2 dated Oct. 26, 2017.

*Primary Examiner* — Woody A Lee, Jr.
(74) *Attorney, Agent, or Firm* — Dority & Manning, P.A.

(57) ABSTRACT

The present disclosure is directed to a hub crane assembly for a wind turbine. The hub crane assembly includes an adjustable articulating arm mountable at a first height on a hub of the wind turbine at a hinge point, a first hoist mountable at a second height of the wind turbine, the second height being greater than the first height, and a support component secured to the first hoist and a first attachment point of the articulating arm. Further, the first hoist is configured to rotate the articulating arm about the hinge point via the support component such that, as the articulating arm rotates, a clearance distance between the wind turbine and the articulating arm changes.

18 Claims, 12 Drawing Sheets

(56) References Cited

U.S. PATENT DOCUMENTS

| | | |
|---|---|---|
| 8,191,253 B2 | 6/2012 | Vangsy |
| 8,319,363 B2 | 11/2012 | Song et al. |
| 8,789,274 B2 | 7/2014 | Bywaters et al. |
| 8,807,923 B2 | 8/2014 | Olesen et al. |
| 8,997,350 B2 | 4/2015 | Trede et al. |
| 9,296,592 B2 | 3/2016 | Pedersen |
| 9,446,446 B2 | 9/2016 | Gabeiras et al. |
| 9,476,403 B2 | 10/2016 | Smith et al. |
| 9,500,090 B2 | 11/2016 | Hvid |
| 9,611,837 B2 | 4/2017 | Abolfazlian et al. |
| 9,651,020 B2 * | 5/2017 | Holloway ............. B66C 23/207 |
| 2010/0139062 A1 | 6/2010 | Reed et al. |
| 2010/0254813 A1 | 10/2010 | Dawson et al. |
| 2011/0206510 A1 | 8/2011 | Langen et al. |
| 2015/0219067 A1 | 8/2015 | Clymans |
| 2015/0226179 A1 | 8/2015 | Neumann et al. |
| 2015/0232307 A1 | 8/2015 | Holloway et al. |
| 2015/0300175 A1 | 10/2015 | Pfeiffer et al. |
| 2015/0300313 A1 | 10/2015 | Choi et al. |
| 2015/0337798 A1 | 11/2015 | Clymans |
| 2016/0010622 A1 | 1/2016 | Modrego Jimenez |
| 2016/0146183 A1 | 5/2016 | Puls |
| 2016/0369767 A1 | 12/2016 | Teichert |
| 2017/0045029 A1 | 2/2017 | Senthoorpandian et al. |
| 2017/0121155 A1 | 5/2017 | Westergaard |

FOREIGN PATENT DOCUMENTS

| | | | |
|---|---|---|---|
| CN | 203079518 U | 7/2013 | |
| CN | 204675721 U | 9/2015 | |
| CN | 105984818 A | 10/2016 | |
| EP | 0 783 630 B1 | 12/1999 | |
| EP | 2 369 174 B1 | 11/2012 | |
| EP | 2 724 019 B1 | 4/2015 | |
| EP | 2 724 020 B1 | 4/2015 | |
| EP | 2 616 670 B1 | 10/2015 | |
| EP | 2 640 965 B1 | 1/2016 | |
| EP | 2 868 914 B1 | 5/2016 | |
| EP | 2 686 550 B1 | 9/2016 | |
| EP | 2 806 155 B1 | 10/2016 | |
| EP | 3 080 443 A1 | 10/2016 | |
| JP | 2015-151989 A | 8/2015 | |
| JP | 2015151989 A * | 8/2015 | ............. F03D 11/00 |
| KR | 101235358 B1 | 2/2013 | |
| WO | 2008/069818 A1 | 6/2008 | |
| WO | 2011/050569 A1 | 5/2011 | |
| WO | 2011/082710 A1 | 7/2011 | |
| WO | 2015/166439 A1 | 11/2015 | |
| WO | 2015/188836 A1 | 12/2015 | |

* cited by examiner

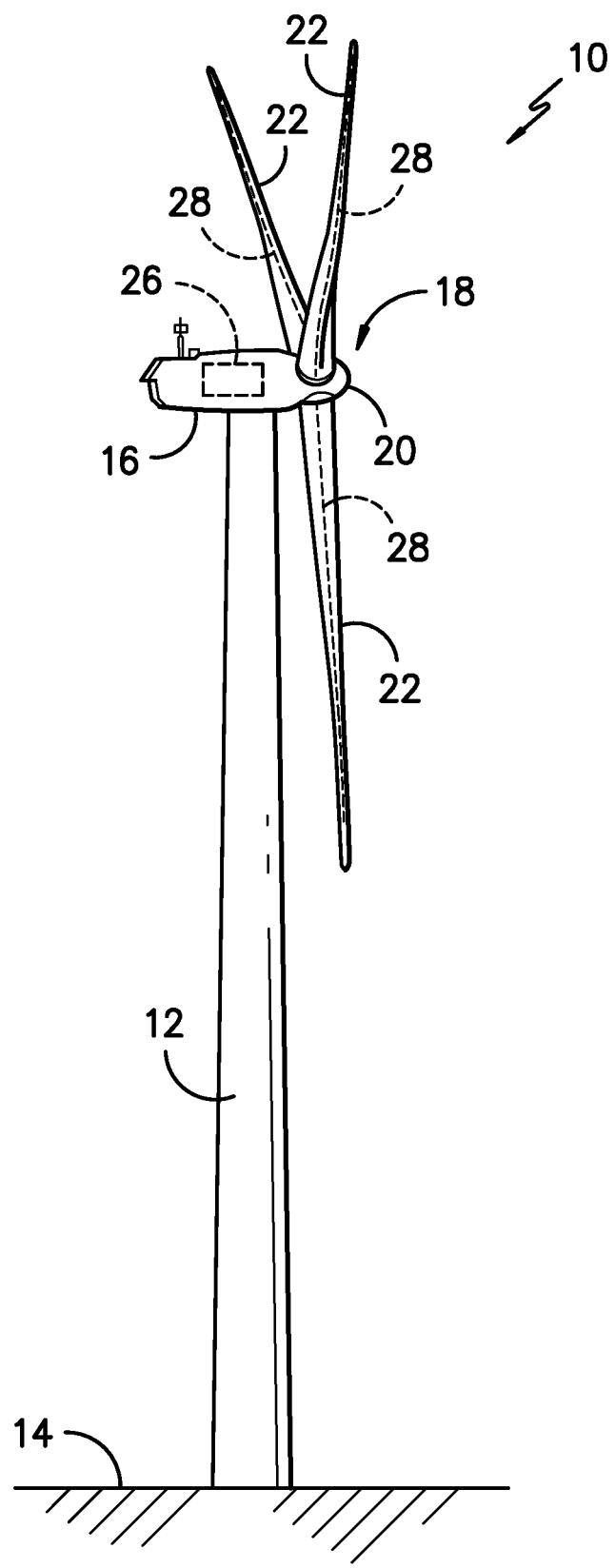
FIG. -1-

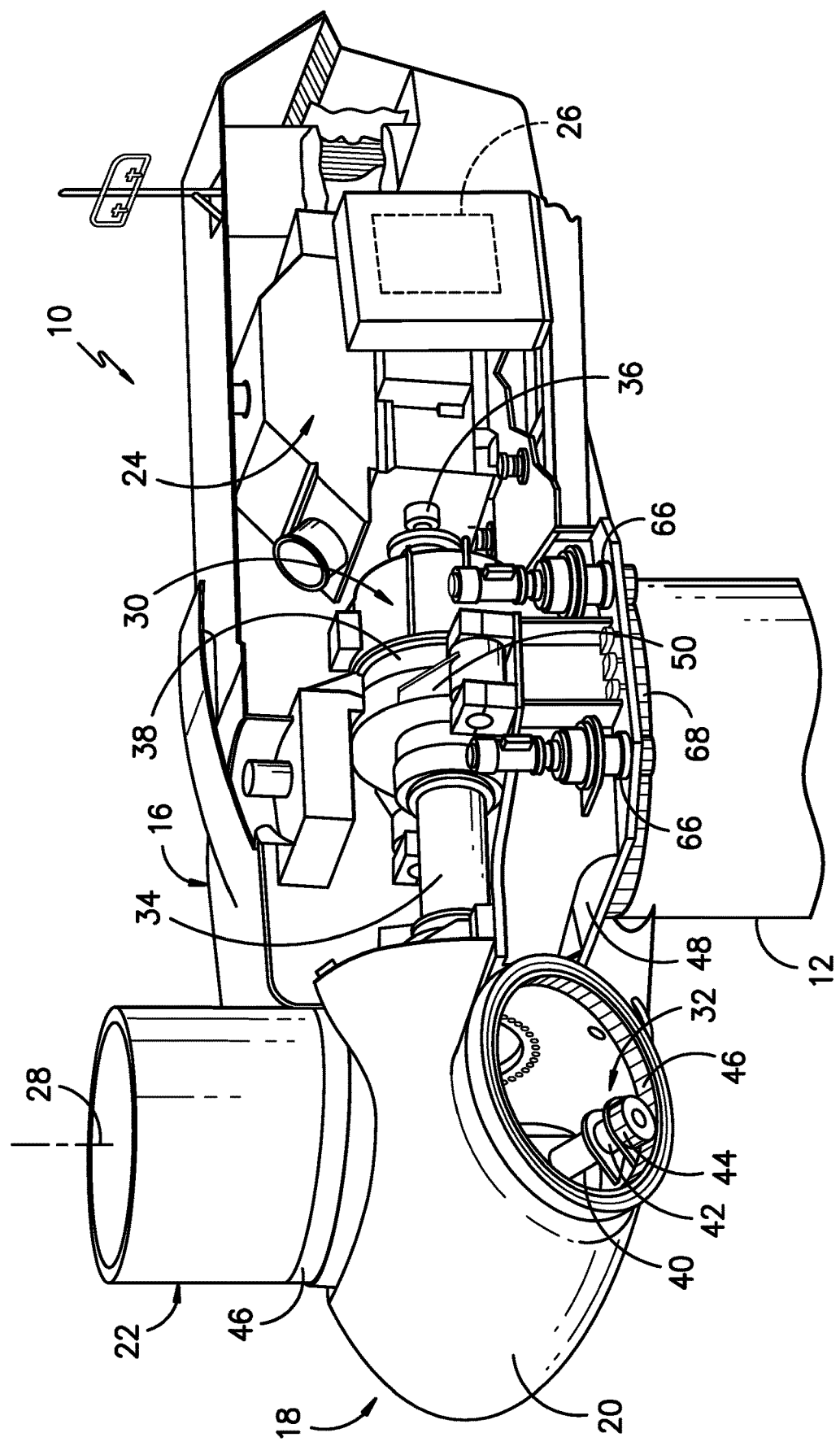
FIG. -2-

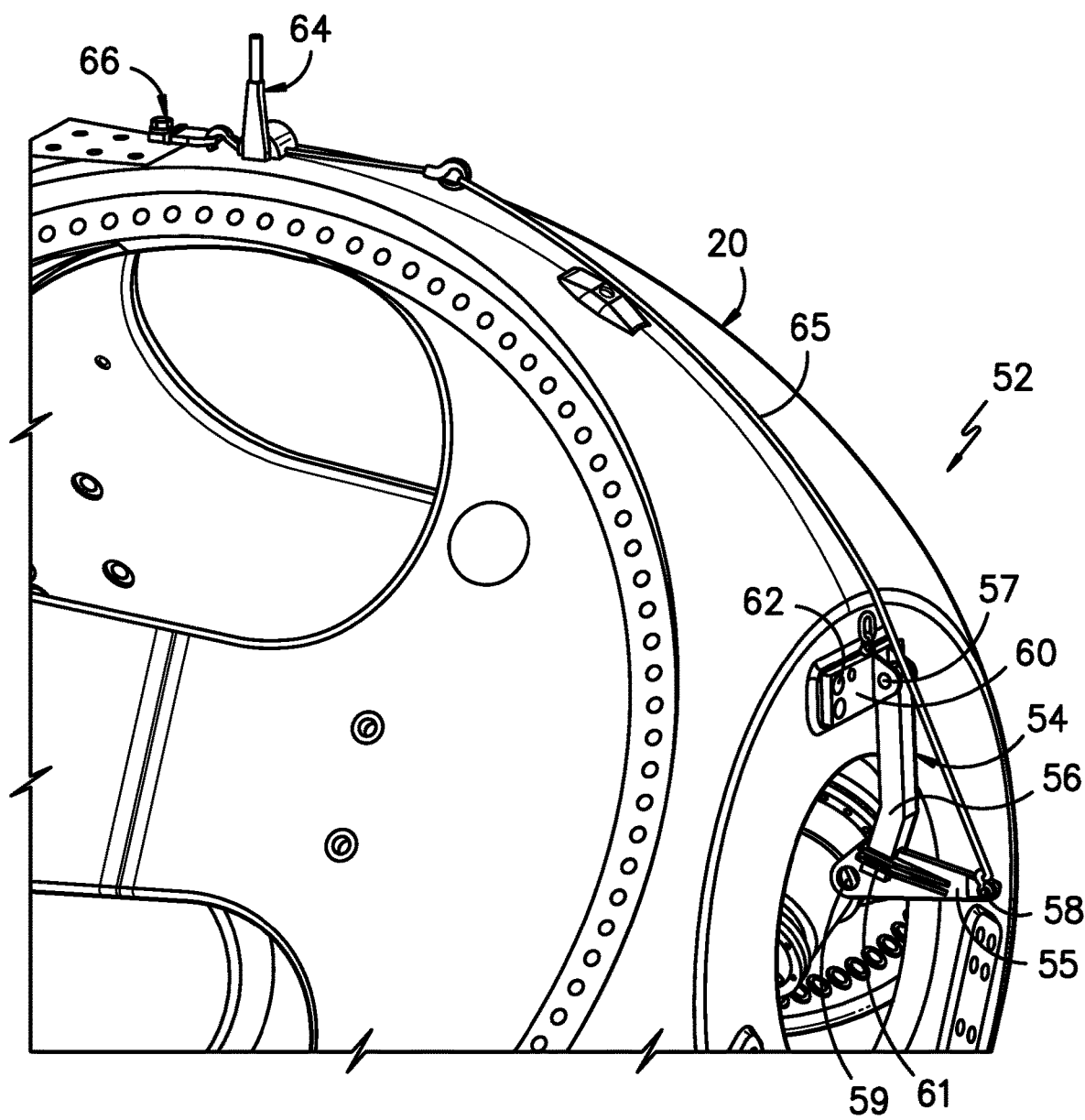
FIG. -3-

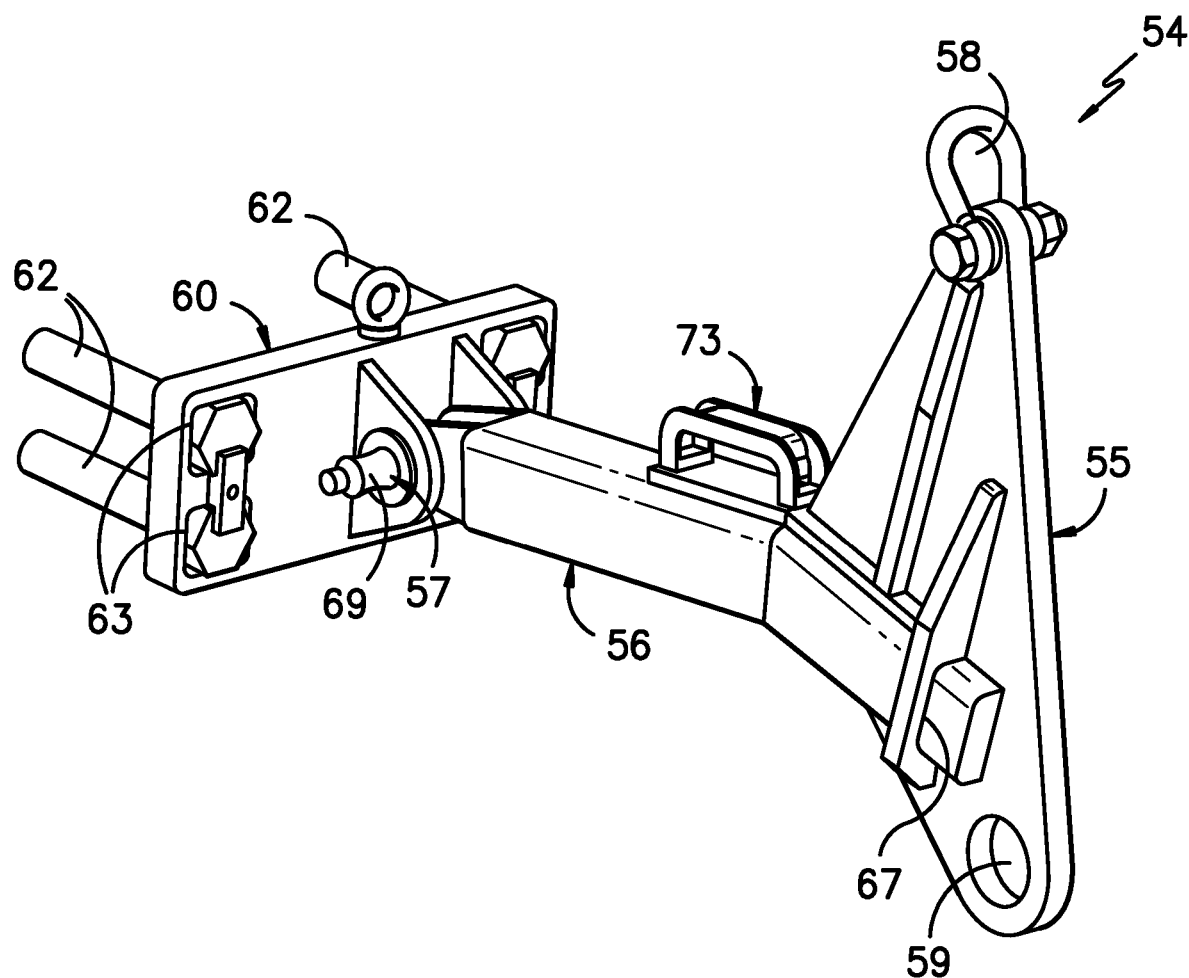
FIG. -4-

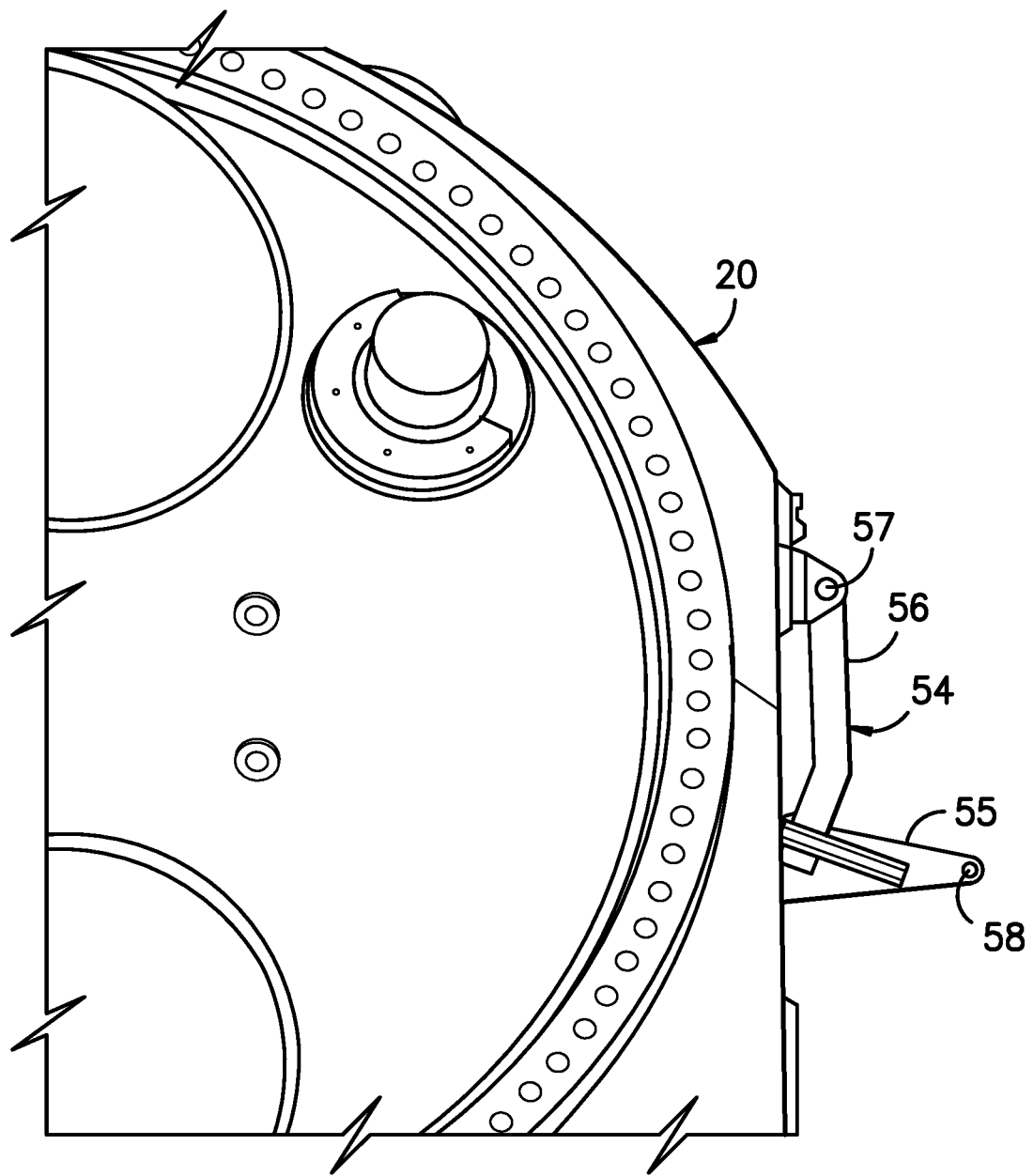
FIG. -5-

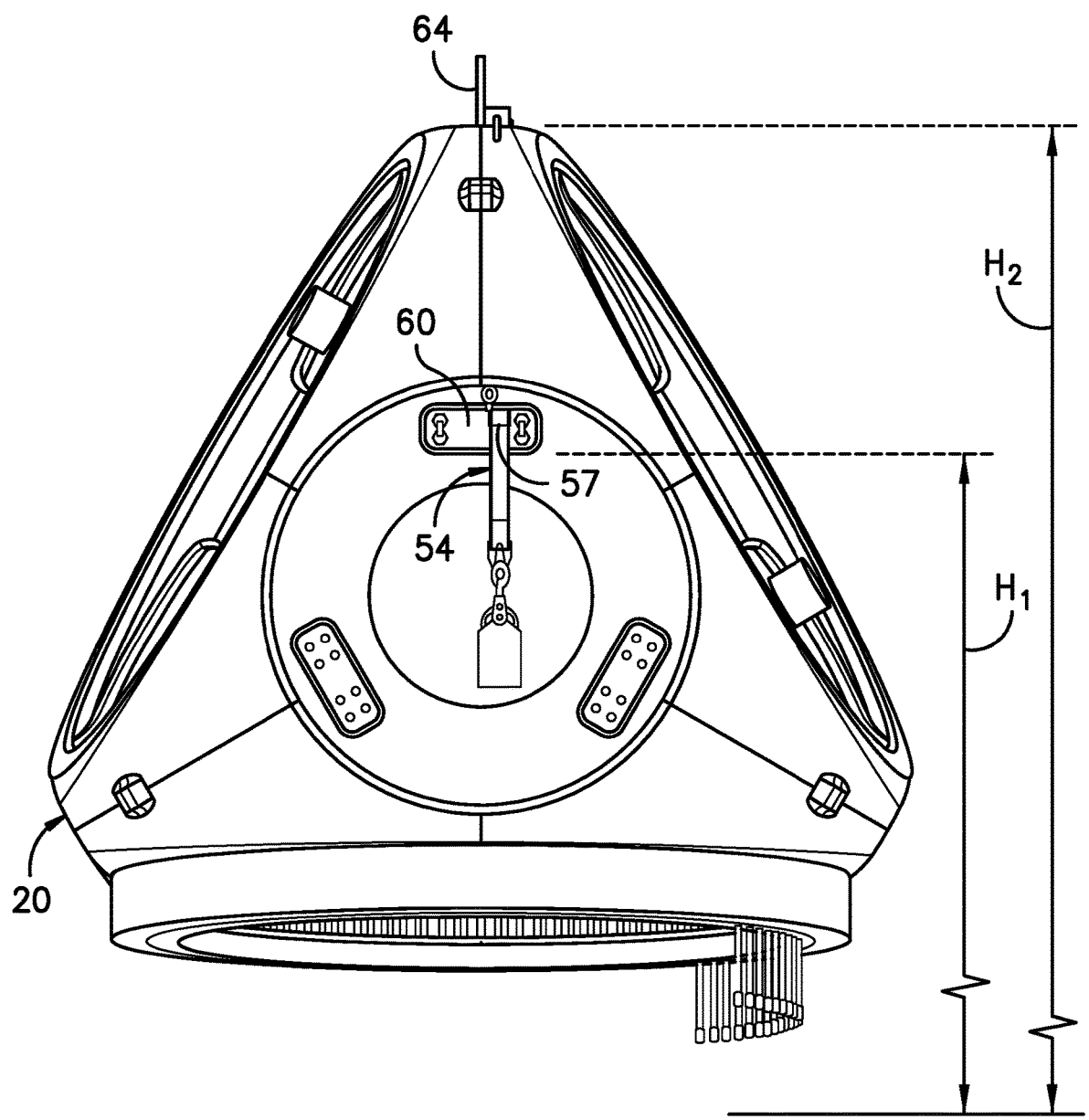
FIG. -6-

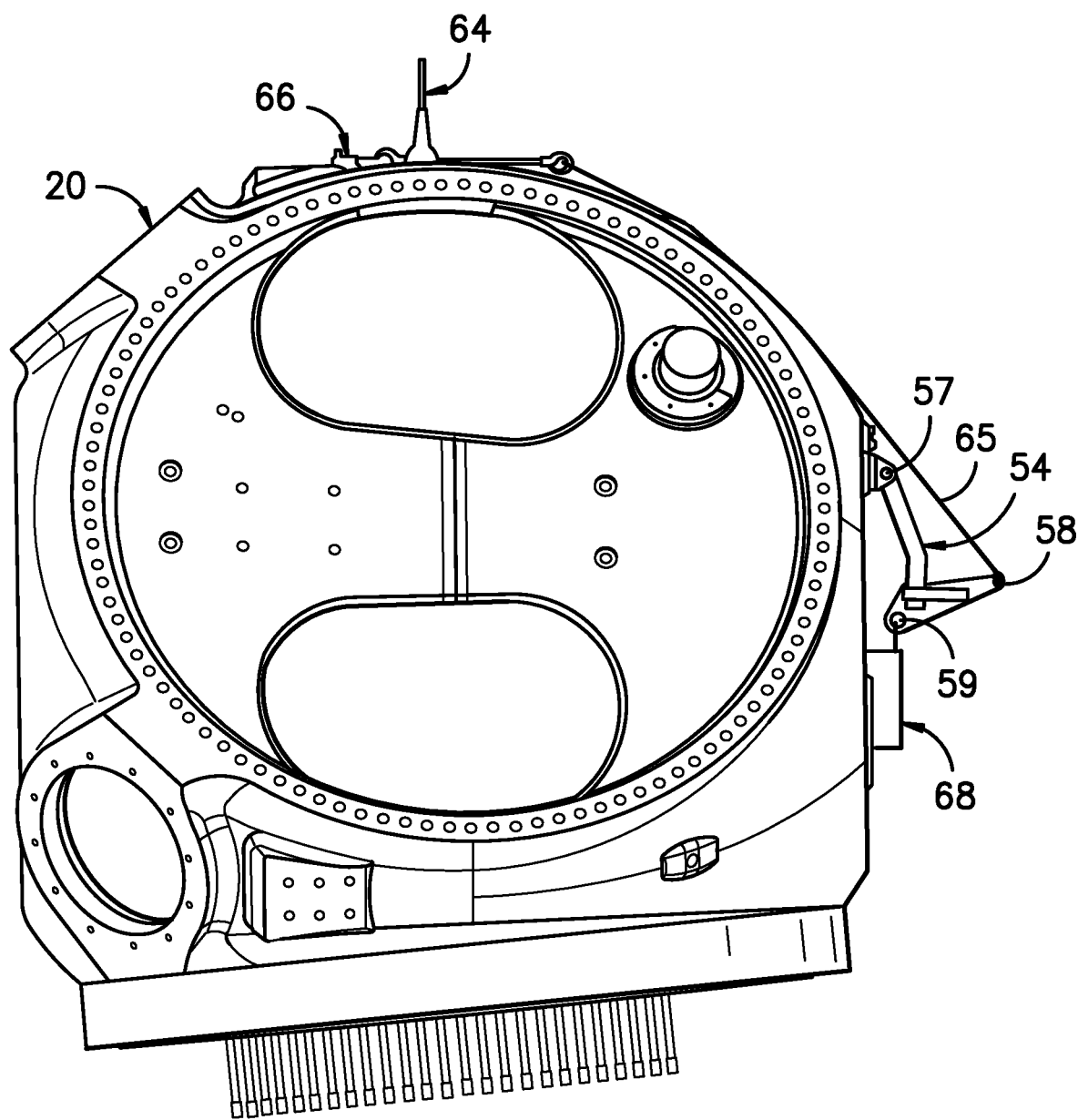
FIG. -7-

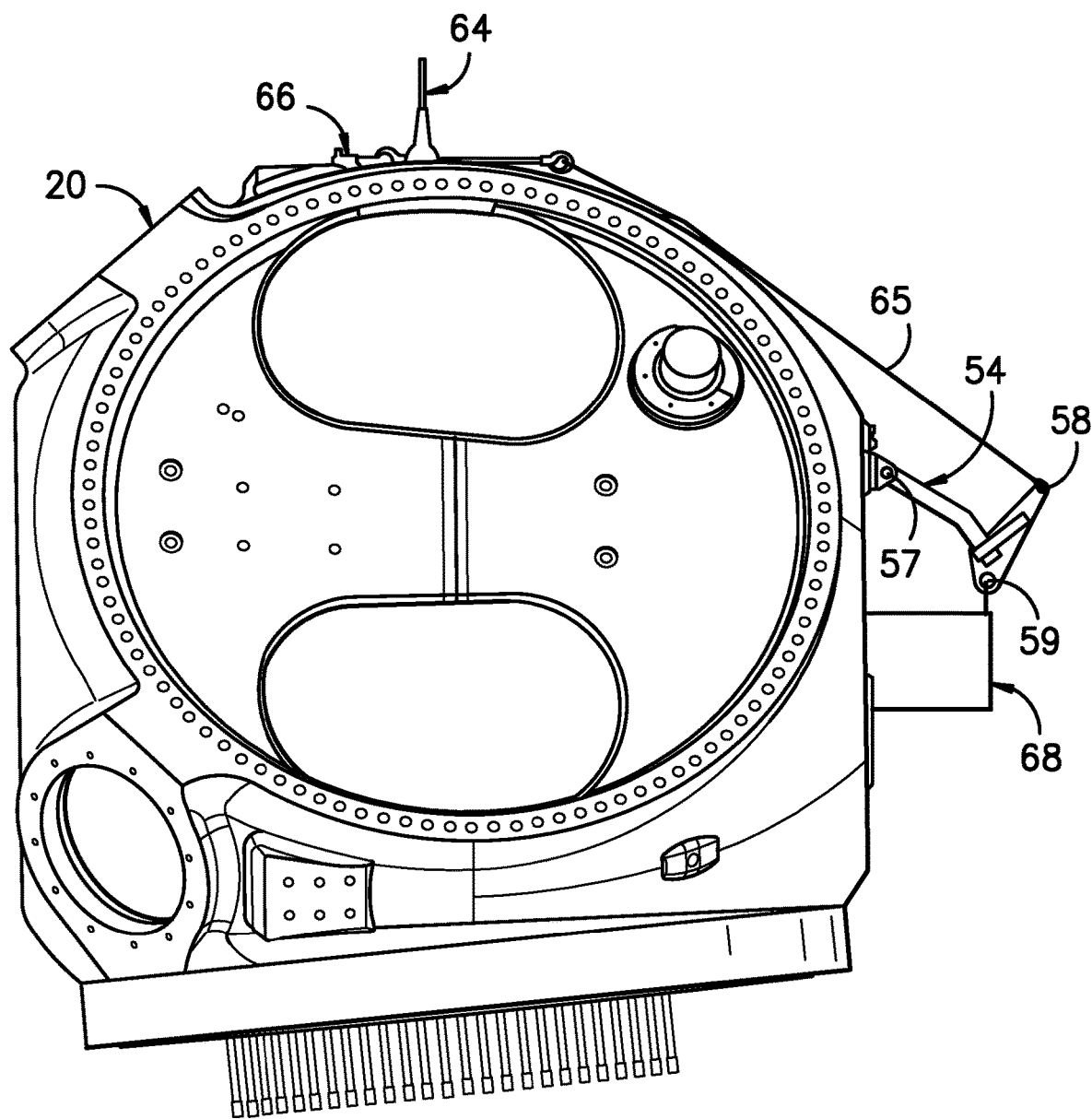
FIG. -8-

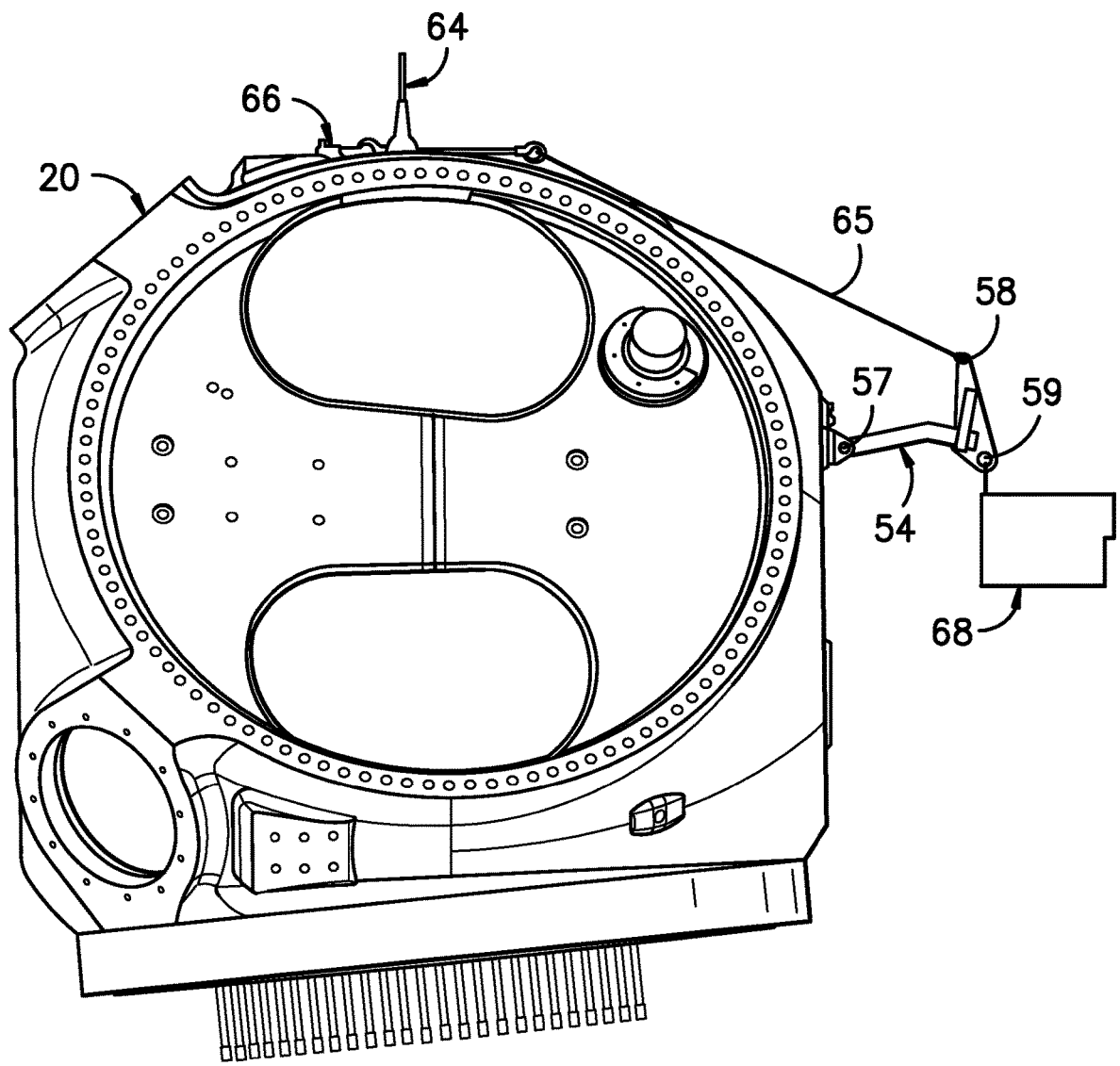
FIG. -9-

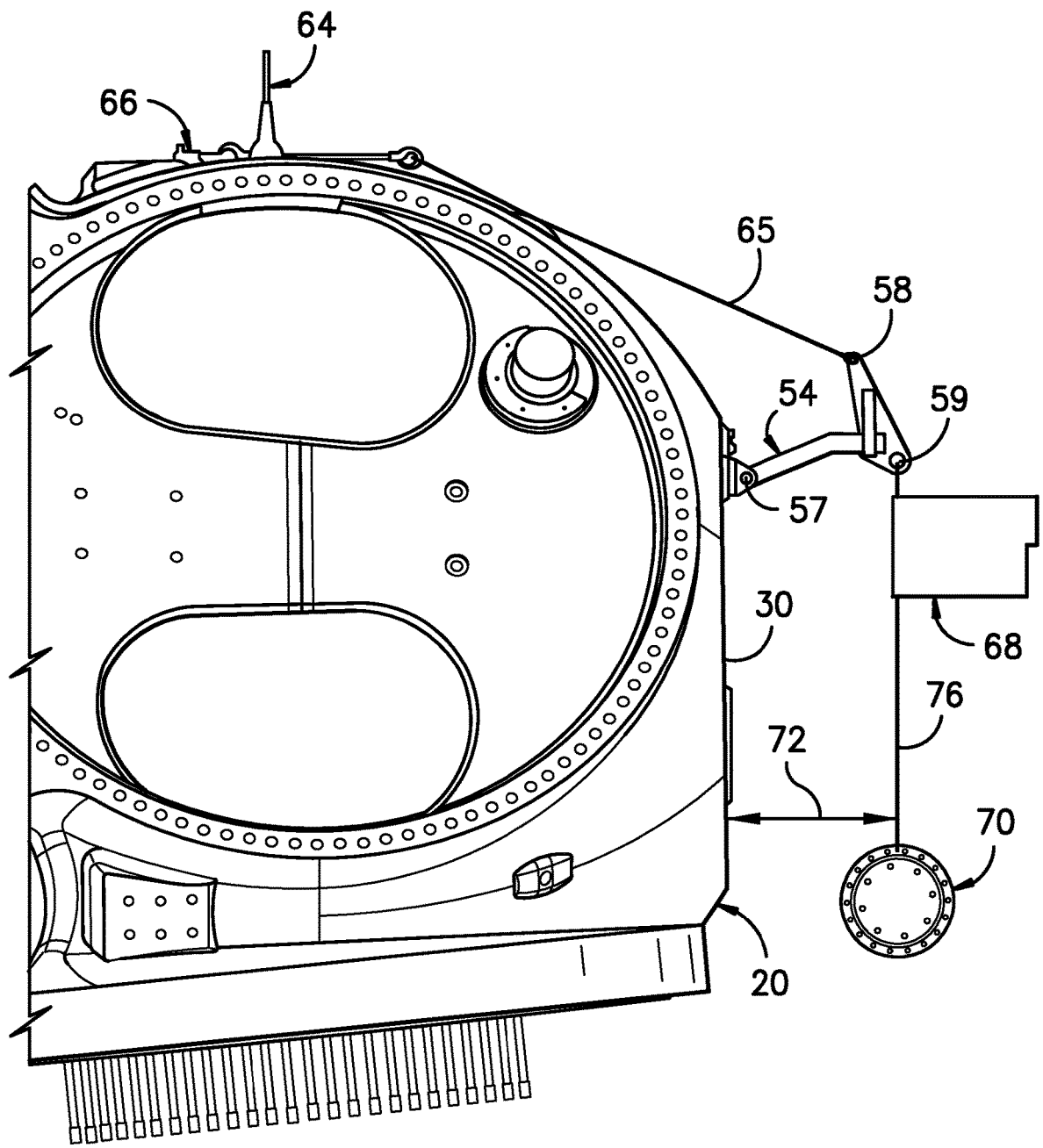
FIG. -10-

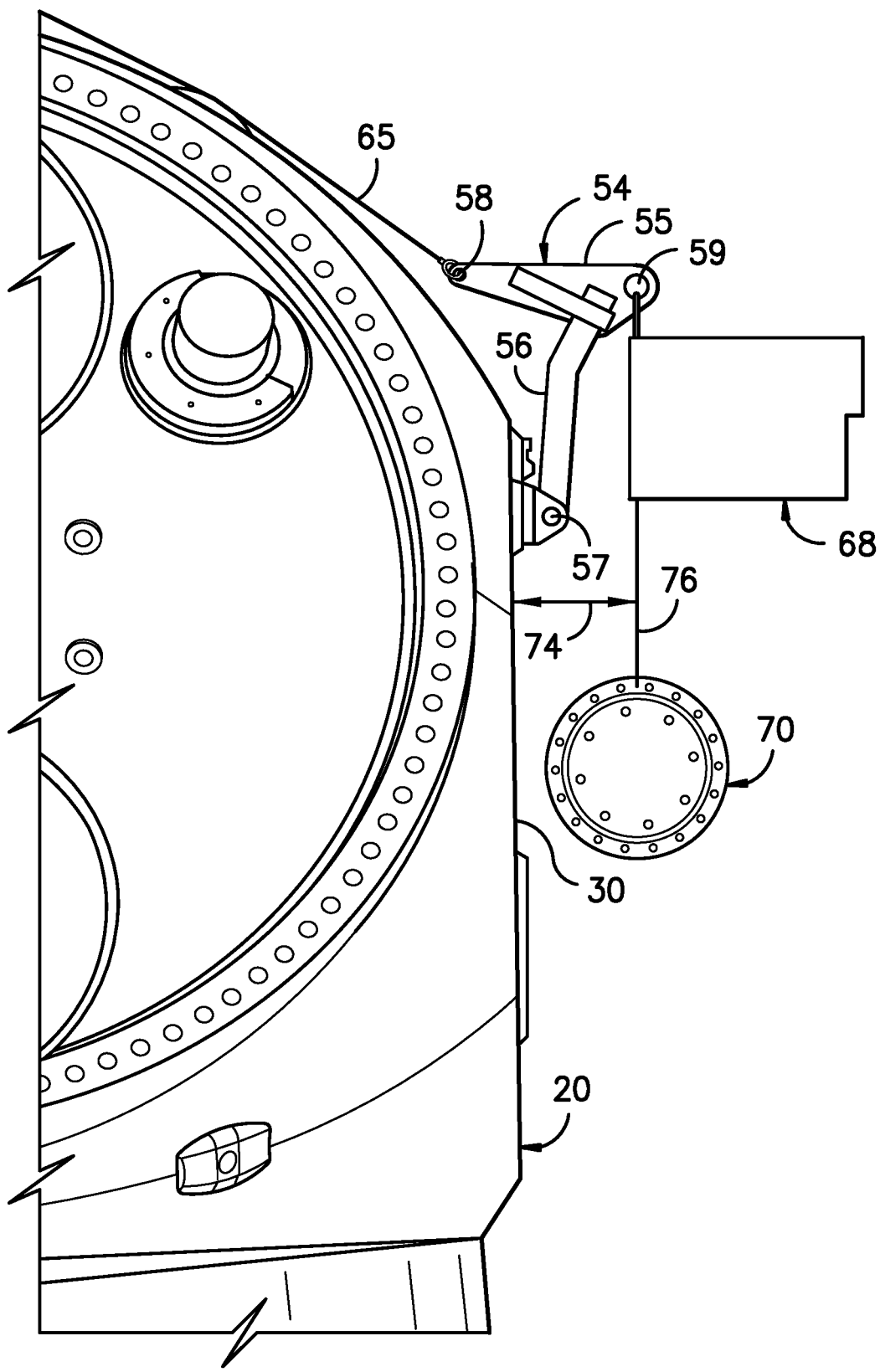
FIG. -11-

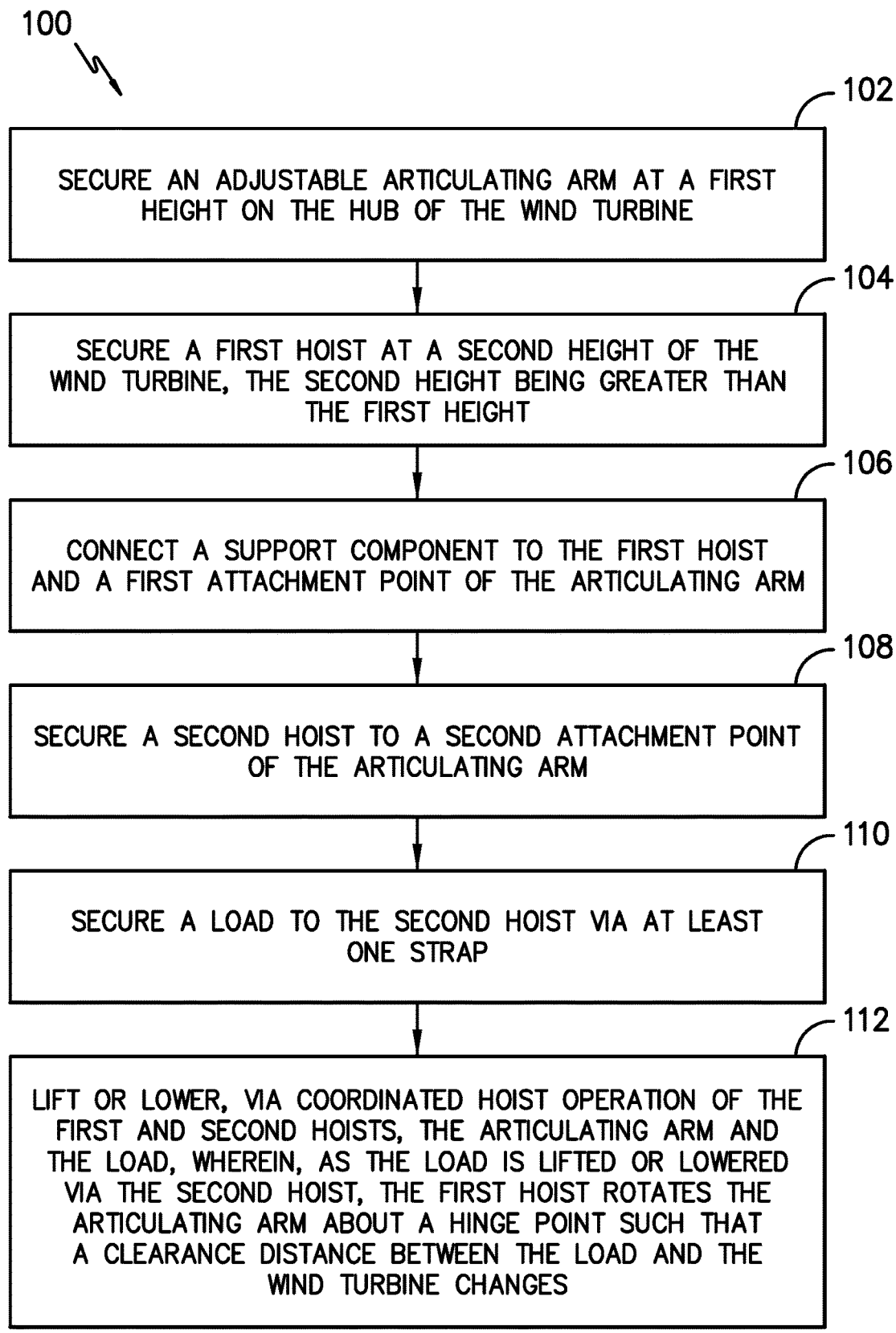
FIG. -12-

HUB CRANE ASSEMBLY FOR A WIND TURBINE

FIELD OF THE INVENTION

The present disclosure relates generally to wind turbines, and more particularly to a hub crane assembly for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor coupled to the gearbox and to the generator. The rotor and the gearbox are mounted on a bedplate support frame located within the nacelle. More specifically, in many wind turbines, the gearbox is mounted to the bedplate via one or more torque supports or arms. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Oftentimes, it is desired to lift or lower various wind turbine components between the ground and the hub and/or nacelle mounted atop the tower. For example, certain components within the nacelle or hub requiring repair and/or maintenance may need to be lowered to the ground or may require repair parts to be lifted uptower. As such, large cranes are typically utilized to lift and lower wind turbine components between the ground or other support surface and the hub/nacelle. Large cranes, however, are expensive and may offer little control of the components being lifted or lowered. Thus, such components may run the risk of colliding with the tower as they are being lifted or lowered.

In view of the aforementioned, an adjustable hub crane assembly for a wind turbine that lifts and lowers various wind turbine components from the ground to an uptower location would be desired in the art. More specifically, a hub crane assembly having an adjustable working radius that allowed the crane to move wind turbine components forward and backwards, thereby changing the distance to the hub, would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a hub crane assembly for a wind turbine. The hub crane assembly includes an adjustable articulating arm mountable at a first height on a hub of the wind turbine at a hinge point, a first hoist mountable at a second height of the wind turbine, the second height being greater than the first height, and a support component secured to the first hoist and a first attachment point of the articulating arm. Further, the first hoist is configured to rotate the articulating arm about the hinge point via the support component such that, as the articulating arm rotates, a clearance distance between the wind turbine and the articulating arm changes.

In one embodiment, the hub crane assembly may include a second hoist secured to the articulating arm at an opposing, second attachment point. In such embodiments, the second hoist is configured to lift or lower a load from a support surface to the hub.

In another embodiment, the articulating arm may include a first arm portion and a second arm portion. More specifically, in certain embodiments, the first and second arm portions may be secured together at a fixed attachment location. For example, in particular embodiments, the fixed attachment location may include the second arm portion of the articulating arm secured within a slot defined in the first arm portion.

In further embodiments, the second arm portion of the articulating arm may be mounted to the hub via a mounting plate at the hinge point.

In additional embodiments, the hub crane assembly may include an anchoring point configured to secure the first hoist to the hub of the wind turbine. More particularly, the anchoring point may include a swivel bolt.

In specific embodiments, the articulating arm may be mountable to a front location of the hub, whereas the first hoist may be mountable to a top location of at least one of the hub or a nacelle of the wind turbine.

In another embodiment, the support component may include a strap, a sling, or similar.

In another aspect, the present disclosure is directed to a method for lifting or lowering a wind turbine component between a support surface and a hub of a wind turbine. The method includes securing an adjustable articulating arm at a first height on the hub of the wind turbine. Further, the method includes securing a first hoist at a second height of the wind turbine, the second height being greater than the first height. Moreover, the method includes connecting a support component to the first hoist and a first attachment point of the articulating arm. In addition, the method includes securing a second hoist to a second attachment point of the articulating arm and securing a load to the second hoist via at least one strap. As such, the method includes lifting or lowering, via coordinated hoist operation of the first and second hoists, the articulating arm and the load. Thus, as the load is lifted or lowered via the second hoist, the first hoist rotates the articulating arm about a hinge point such that a clearance distance between the load and the wind turbine changes.

In one embodiment, the method may further include securing the adjustable articulating arm at the first height on the hub via a mounting plate from within the hub. It should be understood that the method may further include any additional steps and/or features as described herein.

In yet another aspect, the present disclosure is directed to a wind turbine. The wind turbine includes a tower mounted to a support surface, a nacelle mounted atop the tower, a rotor mounted to the nacelle and having a rotatable hub with one or more rotor blades mounted thereto, and a hub crane assembly. The hub crane assembly includes an adjustable articulating arm mountable at a first height on a hub of the wind turbine at a hinge point, a first hoist mountable at a second height of the wind turbine, the second height being greater than the first height, and a support component secured to the first hoist and a first attachment point of the articulating arm. Further, the first hoist is configured to rotate the articulating arm about the hinge point via the support component such that, as the articulating arm rotates, a clearance distance between the wind turbine and the articulating arm changes. It should be understood that the wind turbine may further include any additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to one embodiment of the present disclosure;

FIG. 2 illustrates a perspective view of a simplified, internal view of one embodiment of a nacelle of a wind turbine according to the present disclosure;

FIG. 3 illustrates a partial, perspective view of one embodiment of hub of a wind turbine, particularly illustrating a hub crane assembly according to the present disclosure mounted thereto;

FIG. 4 illustrates a perspective view of one embodiment of an adjustable articulating arm of a hub crane assembly according to the present disclosure;

FIG. 5 illustrates a partial, perspective view of one embodiment of hub of a wind turbine, particularly illustrating a hub crane assembly having an articulating arm in an initial position according to the present disclosure;

FIG. 6 illustrates a front view of one embodiment of hub of a wind turbine, particularly illustrating a hub crane assembly according to the present disclosure mounted thereto;

FIG. 7 illustrates a partial, perspective view of one embodiment of hub of a wind turbine, particularly illustrating a hub crane assembly having an articulating arm in a slightly rotated position according to the present disclosure;

FIG. 8 illustrates a partial, perspective view of one embodiment of hub of a wind turbine, particularly illustrating a hub crane assembly having an articulating arm in a further rotated position such that the second hoist extends partially outside of the hub according to the present disclosure;

FIG. 9 illustrates a partial, perspective view of one embodiment of hub of a wind turbine, particularly illustrating a hub crane assembly having an articulating arm in a maximum distance position with the second hoist extending completely outside of the hub according to the present disclosure;

FIG. 10 illustrates a partial, perspective view of one embodiment of hub of a wind turbine, particularly illustrating a hub crane assembly having an articulating arm in a maximum distance position with a load attached thereto according to the present disclosure;

FIG. 11 illustrates a partial, perspective view of one embodiment of hub of a wind turbine, particularly illustrating a hub crane assembly having an articulating arm in a minimum distance position with a load attached thereto according to the present disclosure; and FIG. 12 illustrates a flow diagram of one embodiment of a method for lifting or lowering a wind turbine component between a support surface and a hub of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a hub crane assembly for a wind turbine. The hub crane assembly includes an adjustable articulating arm, first and second hoists, and a support component secured to the first hoist and a first attachment point of the articulating arm. As such, the first hoist is configured to rotate the articulating arm about the hinge point via the support component such that, as the articulating arm rotates, a clearance distance between the wind turbine and the articulating arm changes. Thus, the second hoist is configured with a load that is lifted and/or lowered from a support surface to the hub. Accordingly, the clearance distance is at a maximum as the load is lifted and is decreased when the load reaches the hub such than an operator can easily bring the load within the hub when it reaches the appropriate height.

The present disclosure provides many advantages not present in the prior art. For example, the hub crane assembly can change the working radius (i.e. the clearance distance) such that it is possible to move the components forward and backwards during lifting and/or lowering thereof. As such, the distance can be increased when desired (i.e. to maintain distance from the tower during lifting/lowering) or decreased as needed (i.e. when the components need to be brought within the hub). As such, large cranes can be eliminated during certain lifting and/or lowering procedures. In addition, the hub crane assembly can be easily installed from within the hub, thereby eliminating dangerous installation procedures atop the wind turbine tower for operators.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. Further, the gearbox 38 is connected to a bedplate support frame 48 by one or more torque supports 50. As is generally understood, the rotor shaft 34 provides a low speed, high torque input to the gearbox 38 in response to rotation of the rotor blades 22 and the hub 20. The gearbox 38 then converts the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28, depending on the wind speed and/or wind direction. As such, pitching the blades 22 directly affects the power output of the generator 24. More specifically, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Referring now to FIGS. 3-11, various views of one embodiment of a hub crane assembly 52 mounted to a wind turbine 10 according to the present disclosure is illustrated. As shown, the hub crane assembly 52 includes an adjustable articulating arm 54, a first hoist 64, a support component 65, and an optional anchoring point 66. As shown particularly in FIGS. 3 and 5-11, the articulating arm 54 is mounted on the hub 20 of the wind turbine 10 via a hinge point 57. In addition, as shown in FIG. 4, the articulating arm 54 may include a first arm portion 55 and a second arm portion 56. More specifically, as shown, the first and second arm portions 55, 56 may be secured together at a fixed attachment location 61. For example, as shown in FIG. 4, the fixed attachment location 61 may include the second arm portion 56 of the articulating arm 54 being secured within a slot 67 defined in the first arm portion 55. As such, an end of the second arm portion 56 may fit within the slot 67 of the first arm portion 55 and secured therein, e.g. via mechanical fasteners, adhesives, welding, or similar. In alterative embodiments, the first and second arm portions 55, 56 may be secured together without the use of the slot 67. In addition, as shown particularly in FIG. 4, the articulating arm 54 may also include a handle 73 (e.g. mounted to the second arm portion 56) such that an operator can easily lift and move the articulating arm 54.

Referring particularly to FIG. 6, the articulating arm 54 may be mounted on the hub 20 of the wind turbine 10 at a first height $H_1$, whereas the first hoist 64 is mounted at a second height $H_2$ of the wind turbine 10. Further, as shown in the illustrated embodiment, the second height $H_2$ is greater than the first height $H_1$. In addition, as shown generally in FIGS. 3 and 4-11, the articulating arm 54 may be mountable to a front location of the hub 20, whereas the first hoist 64 may be mountable to a top location of at least one of the hub 20 or the nacelle 16 of the wind turbine 10. As such, the articulating arm 54 may be easily mounted to the front location from within the hub 20 such that an operator is not required to leave the hub 20.

In further embodiments, as shown in FIGS. 3 and 4, the adjustable articulating arm 54 may be mounted to the hub 20 via a mounting plate 60. More specifically, as shown, the second arm portion 56 of the articulating arm 54 may be mounted to the hub 20 via the mounting plate 60 at the hinge point 57. For example, the mounting plate 60 may include a plurality of bolt holes and corresponding bolts 62 that can be secured via a plurality of nuts (not shown) from inside the hub 20. In addition, as shown, the mounting plate 60 may include the hinge point 57. Thus, as shown in FIG. 4, the second arm portion 56 of the articulating arm 54 may be secured to the mounting plate 60 at the hinge point 57 via a pin 69.

Referring particularly to FIGS. 3 and 7-11, the support component 65 is secured to the first hoist 64 and a first attachment point 58 of the articulating arm 54. More specifically, as shown, the support component 65 may include a strap, a sling, or similar. In additional embodiments, the anchoring point 66 is configured to secure the first hoist 64 to the hub 20 of the wind turbine 10. More particularly, in certain embodiments, the anchoring point 66 may include a swivel bolt or any other suitable fastener so as to further secure the first hoist 64 to the hub 20.

Referring now to FIGS. 7-11, the hub crane assembly 52 may also include a second hoist 68 secured to the articulating arm 54 at an opposing, second attachment point 59 of the first arm portion 55. In such embodiments, the second hoist 68 is configured to lift or lower a load 70 from a support surface (e.g. support surface 14) to the hub 20. It should be understood that the first and second hoists 55, 56 described herein may include any suitable hoist apparatus now known or later developed that is capable of hoisting (i.e. lifting or lowering) a load. As such, the present disclosure is not limited to any particular hoist configuration. In addition, the first and second hoists 55, 56 may be controller manually, e.g. via an operator, or automatically, e.g. via a controller.

Thus, as shown generally in FIGS. 3-12, the first hoist 64 is configured to rotate the articulating arm 54 about the hinge point 57 via the support component 65 such that, as the articulating arm 54 rotates, a clearance distance (e.g. as illustrated by distances 72 and 74) between the wind turbine 10 and the articulating arm 54 (and also the load 70) changes. More specifically, as shown in FIG. 12, a flow diagram of one embodiment of a method 100 for lifting or lowering a wind turbine component between a support surface (e.g. support surface 14) and a hub 20 of a wind turbine 10 using the hub crane assembly 52 of the present disclosure is illustrated.

As shown at 102, the method 100 includes securing the adjustable articulating arm 54 at the first height $H_1$ on the hub 20 of the wind turbine 10. More specifically, as shown in FIGS. 5 and 6, the articulating arm 54 may be installed in a first position closest to the hub 20. This position allows an operator to easily install the mounting plate 60 as described above and secure the articulating arm 54 thereto without having to leave the inside of the hub 20.

As shown at 104, the method 100 includes securing a first hoist 64 at a second height $H_2$ of the wind turbine 10, wherein the second height $H_2$ is greater than the first height $H_1$. For example, as shown in FIG. 7, the first hoist 64 can also be installed from inside the hub 20 to a location atop the hub 20.

As shown at 106, the method 100 includes connecting a support component 65 to the first hoist 64 and a first attachment point 58 of the articulating arm 54. For example, the support component 65 may be routed from the first hoist 64 mounted atop the hub 20 to the articulating arm 54 and secured to the first attachment point 58. As shown at 108, the method 100 includes securing a second hoist 68 to a second attachment point 59 of the articulating arm 54. In addition, as shown, an operator may also secure the second hoist 68 to the second attachment point 59 from inside of the hub 20.

Referring still to FIG. 12, as shown at 110, the method 100 includes securing a load 70 to the second hoist 65 via at least one support line 76 (FIGS. 10 and 11). Thus, as shown at 112, the method 100 includes lifting or lowering, via coordinated hoist operation of the first and second hoists 64, 68, the articulating arm 54 and the load 70. Accordingly, as the load 70 is lifted or lowered via the second hoist 68, the first hoist 64 rotates the articulating arm 54 about the hinge point 57 such that the clearance distance 72, 74 between the load 70 and the wind turbine 10 (e.g. the tower 12) changes. More specifically, as shown, as the first hoist 64 rotates the articulating arm 54 upwards, the second hoist 68 is suspended outside of the hub 20 and the articulating arm 54 extends outward from the hub 20 at its maximum length. (See e.g., FIGS. 8-10; distance 72). Thus, as the load is lifted and/or lowered, the clearance distance 72 is maximized via the adjustable articulating arm 54 so as to prevent collisions between the load 70 and the tower 12 of the wind turbine 10.

In addition, as shown in FIGS. 10 and 11, the articulating arm 54 continues to rotate upwards towards the first hoist 54 until the load 70 has reached an opening 30 of the hub 20. At this time, an operator can easily retrieve the load 70 from the support line 76 and bring the load within the hub 20. It should be understood that the load 70 described herein may include any suitable wind turbine components, such as, for example, the pitch drive mechanism 32 and/or any other components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hub crane assembly, comprising:
    an adjustable articulating arm for mounting at a first height on a hub of a wind turbine at a hinge point, the articulating arm comprising a first attachment point and an opposing, second attachment point;
    a first hoist for mounting at a second height of the wind turbine, the second height being greater than the first height; and,
    a second hoist secured to the articulating arm at the second attachment point, the second hoist configured to lift or lower a load from a support surface to the hub;
    a support component secured to the first hoist and the first attachment point,
    wherein the first hoist is configured to rotate the articulating arm about the hinge point via the support component such that, when the hub crane assembly is mounted to the wind turbine and the articulating arm rotates, a clearance distance between the wind turbine and the articulating arm changes.

2. The hub crane assembly of claim 1, wherein the articulating arm comprises a first arm portion and a second arm portion, the first and second arm portions secured together at a fixed attachment location.

3. The hub crane assembly of claim 2, wherein the fixed attachment location comprises the second arm portion of the articulating arm secured within a slot defined in the first arm portion.

4. The hub crane assembly of claim 2, wherein the second arm portion of the articulating arm is mounted to the hub via a mounting plate at the hinge point.

5. The hub crane assembly of claim 1, further comprising an anchoring point configured to secure the first hoist to the hub of the wind turbine.

6. The hub crane assembly of claim 5, wherein the anchoring point comprising a swivel bolt.

7. The hub crane assembly of claim 1, wherein the articulating arm is mountable to a front location of the hub.

8. The hub crane assembly of claim 1, wherein the first hoist is mountable to a top location of at least one of the hub or a nacelle of the wind turbine.

9. The hub crane assembly of claim 1, wherein the support component comprises at least one of a strap or a sling.

10. A method for lifting or lowering a wind turbine component between a support surface and a hub of a wind turbine, the method comprising:
    securing an adjustable articulating arm at a first height on the hub of the wind turbine, the articulating arm comprising a first attachment point and an opposing, second attachment point;
    securing a first hoist at a second height of the wind turbine, the second height being greater than the first height;
    connecting a support component to the first hoist and the first attachment point of the articulating arm;
    securing a second hoist to the second attachment point of the articulating arm;
    securing a load to the second hoist via at least one strap; and,
    lifting or lowering, via coordinated hoist operation of the first and second hoists, the articulating arm and the load, wherein, as the load is lifted or lowered via the second hoist, the first hoist rotates about a hinge point such that a clearance distance between the load and the wind turbine changes.

11. The method of claim 10, further comprising securing the adjustable articulating arm at the first height on the hub via a mounting plate from within the hub.

12. A wind turbine, comprising:
a tower mounted to a support surface;
a nacelle mounted atop the tower;
a rotor mounted to the nacelle, the rotor comprising a rotatable hub having one or more rotor blades mounted thereto; and,
a hub crane assembly comprising:
an adjustable articulating arm mounted at a first height on the rotatable hub at a hinge point;
a first hoist mounted at a second height of the wind turbine, the second height being greater than the first height;
an anchoring point configured to secure the first hoist to the hub of the wind turbine; and,
a support component secured to the first hoist and a first attachment point of the articulating arm,
wherein the first hoist is configured to rotate the articulating arm about the hinge point via the support component such that, as the articulating arm rotates, a clearance distance between the wind turbine and the articulating arm changes.

13. The wind turbine of claim 12, further comprising a second hoist secured to the articulating arm at an opposing, second attachment point, the second hoist configured to lift or lower a load from a support surface to the hub.

14. The wind turbine of claim 12, wherein the articulating arm comprises a first arm portion and a second arm portion, the first and second arm portions secured together at a fixed attachment location.

15. The wind turbine of claim 14, wherein the fixed attachment location comprises the second arm portion of the articulating arm secured within a slot defined in the first arm portion.

16. The wind turbine of claim 14, wherein the second arm portion of the articulating arm is mounted to the hub via a mounting plate at the hinge point.

17. The wind turbine of claim 12, wherein the articulating arm is mountable to a front location of the hub.

18. The wind turbine of claim 12, wherein the first hoist is mountable to a top location of at least one of the hub or a nacelle of the wind turbine.

* * * * *